(12) United States Patent
Hedaoo et al.

(10) Patent No.: US 10,084,852 B1
(45) Date of Patent: Sep. 25, 2018

(54) SEPARATED DEVICE DETECTION ARCHITECTURE

(71) Applicant: Wells Fargo Bank, N.A., San Francisco, CA (US)

(72) Inventors: Shailesh Hedaoo, Fremont, CA (US); Ashish G. Khapre, Fremont, CA (US); Ranganathan Kanchi, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 168 days.

(21) Appl. No.: 15/287,191

(22) Filed: Oct. 6, 2016

Related U.S. Application Data

(60) Provisional application No. 62/238,332, filed on Oct. 7, 2015.

(51) Int. Cl.
  *G06F 15/16* (2006.01)
  *H04L 29/08* (2006.01)
  *G06F 17/30* (2006.01)

(52) U.S. Cl.
  CPC ........ *H04L 67/10* (2013.01); *G06F 17/30569* (2013.01); *H04L 67/327* (2013.01); *H04L 67/02* (2013.01)

(58) Field of Classification Search
  USPC .......................... 709/219, 203, 200, 224, 226
  See application file for complete search history.

(56) References Cited

U.S. PATENT DOCUMENTS

| | | | |
|---|---|---|---|
| 7,936,736 B2* | 5/2011 | Proctor, Jr. | H04W 4/029 370/338 |
| 8,615,712 B2 | 12/2013 | Porter | |
| 8,832,181 B2 | 9/2014 | Merissert-Coffinieres et al. | |
| 8,887,182 B2 | 11/2014 | Low et al. | |
| 2008/0077653 A1* | 3/2008 | Morris | G06F 17/30896 709/203 |
| 2009/0287837 A1* | 11/2009 | Felsher | G06F 19/328 709/229 |
| 2012/0124640 A1* | 5/2012 | Bender | G06F 21/6218 726/1 |
| 2014/0089395 A1 | 3/2014 | Atsatt et al. | |

\* cited by examiner

*Primary Examiner* — El Hadji Sall
(74) *Attorney, Agent, or Firm* — Schwegman Lundberg & Woessner, P.A.

(57) ABSTRACT

A method for responding to a content retrieval request at a server may include receiving the content retrieval request from a computing device; detecting, at a device aware controller, at least one device capability of the computing device; setting, at the device aware controller, a rule boundary for the content retrieval request based on the at least one device capability; forwarding the content retrieval request with the rule boundary to a device agnostic controller, wherein the content retrieval request does not include capability information associated with the computing device; receiving from the device agnostic controller at the device aware controller, data corresponding to the content retrieval request with the rule boundary applied; and providing the data with the rule boundary applied to the computing device for presentation on the computing device.

20 Claims, 6 Drawing Sheets

US 10,084,852 B1

SEPARATED DEVICE DETECTION ARCHITECTURE

CROSS-REFERENCE TO RELATED APPLICATION

This patent application claims the benefit of U.S. Provisional Patent Application No. 62/238,332, filed Oct. 7, 2015, entitled "SEPARATED DEVICE DETECTION ARCHITECTURE", which is incorporated by reference herein in its entirety.

TECHNICAL FIELD

Embodiments described herein generally relate to programming architectures and in particular, but not by way of limitation to a separated device detection architecture.

BACKGROUND

Users often use different devices to access the same type of content (e.g., a webpage or content for a native application). Furthermore, a user may use different access methods, even on the same device. For example, a user may request social media updates, sports scores, recent banking transactions, upcoming calendar events, etc., via a dedicated application (e.g., a mobile app downloaded from an app store) or via a web browser.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Users often use different devices to access the same type of content (e.g., a webpage or content for a native application). Furthermore, a user may use different access methods, even on the same device. For example, a user may request social media updates, sports scores, recent banking transactions, upcoming calendar events, etc., via a dedicated application (e.g., a mobile app downloaded from an app store) or via a web browser.

Each device may have different capabilities. The capabilities may relate to physical characteristics of a device such as the dimensions of a display device or the presence of a camera. The capabilities may also include information on the operating capabilities of the device such as the type of operating system. Accordingly, the provider of the requested content may want to present the content in different manners depending on the capabilities of the device.

In the past, providers of content have used techniques such as conditional logic statements within webpages to address the different capabilities. This approach has many technical deficiencies. For example, the size of the webpage itself may increase to address each new capability the provider wants to use for the basis of presenting the content. Second, for each new piece of content, each branch of the conditional statements may need to be filled in. Again, this may dramatically increase the size of the web page being served. Third, on less computationally-able devices (e.g., older mobile phones) client-side processing of the conditional statements may lead to unacceptable performance. Another similar approach would be to have different versions of the content for each type of device. For example, a mobile version of the content is served when a mobile device is detected. This approach would require many versions of the same content to be maintained.

Another approach content providers have used is to take their existing content and apply a third-party framework. The content provider may tag various parts of the webpage such that, depending on the device, the content may be presented differently. Again, this approach creates additional computational overhead for the receiving devices. Furthermore, in some implementation, it relies on communicating with a third-party creating the potential for security risks. Also, the content provider must manually tag content on each webpage and add tags for new content.

In view of the technical deficiencies of existing solutions, a layered system is described herein that, among other advantages, modularizes the content and insulates the decision of how to present the content from the client device. Furthermore, the data sources that may be accessed may be unaware of the capabilities of the device. Thus, in various examples described in more detail below, a content provider may develop one application that can be executed on many devices, yet, the presentation of the content is tailored to the individual device.

Figure 1:
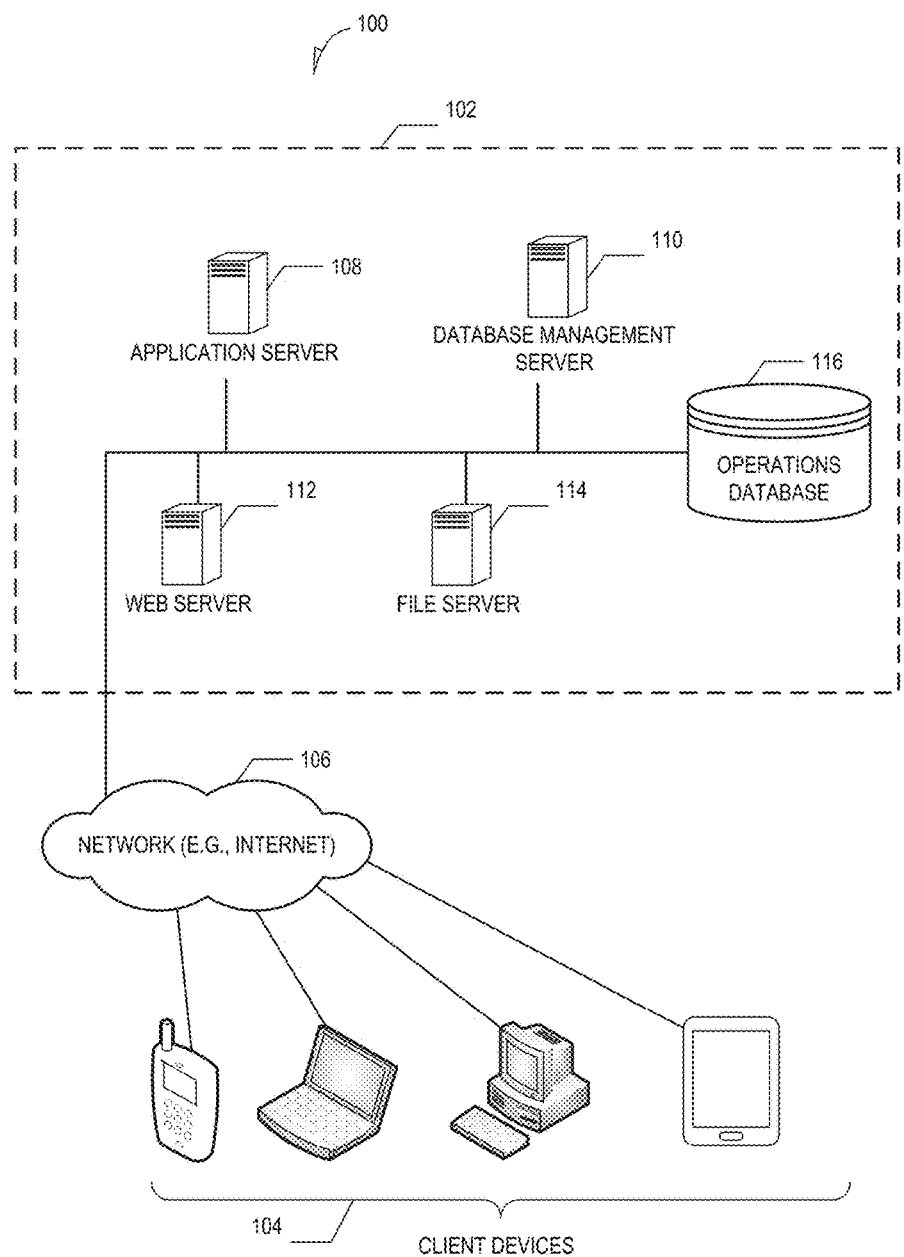
FIG. 1. illustrates a schematic diagram of a system, according to various examples.

FIG. 1. illustrates a schematic diagram 100 of system 102. System 102 is illustrated as including application server 108, database management server 110 (DBMS), web server 112, file server 114, and operation database 116. System 102 may communicate with one or more client devices 104 via the network 106. Types of client devices may include a cell phone device, desktop device, tablet device, and wearable device (e.g., smart watches).

Although the system 102 is illustrated as a combination of application server 108, DBMS 110, web server 112, file server 114, and database 116, the system 102 may be made up of additional or fewer components. For example, the database 116 may be part of DBMS 110, or the functionality of the web server 112 and application server 108 may be performed by a single server without departing from the scope of this disclosure. Furthermore, the components of the system 102 may be in a single geographic location or in a diverse set of locations.

In various examples, the servers and components of the diagram 100 may communicate via one or more networks such as the network 106. The network 106 may include local-area networks (LAN), wide-area networks (WAN), wireless networks (e.g., 802.11 or cellular network), the Public Switched Telephone Network (PSTN) network, ad hoc networks, cellular, personal area networks or peer-topeer (e.g., Bluetooth®, Wi-Fi Direct), or other combinations or permutations of network protocols and network types. The network 106 may include a single local area network (LAN) or wide-area network (WAN), or combinations of LAN's or WAN's, such as the Internet.

Data used in the system 102 may be organized and stored in a variety of manners. For convenience, the organized collection of data is described herein as the database 116. The specific storage layout and model used in database 116 may take a number of forms—indeed, database 116 may utilize multiple models. The database 116 may be, but is not limited to, a relational database (e.g., SQL), non-relational database (NoSQL) a flat file database, object model, document details model, or a file system hierarchy. The database 116 may store data on one or more storage devices (e.g., a hard disk, random access memory (RAM), etc.). The storage devices may be in standalone arrays, part of one or more servers, and may be located in one or more geographic areas.

The system 102 may serve content from one or more content providers, including, but not limited to, social networks, entertainment companies, financial institutions, utility companies, etc. The served content may be in response to a content retrieval request from a native application executing on the client device 104. The application may be a hybrid application that includes HTML5 code within a native application wrapper (e.g., a wrapper that is specific to the operating system of the client device 104).

The HTML5 code may include requests for content from the system 102 via asynchronous JavaScript and XML (AJAX) calls. Other programming and data transfer paradigms may also be used without departing from the scope of this disclosure. For example, JavaScript Object Notation (JSON) objects may be used as a container for the data. In an example, content is requested via an application programming interface (API) provided by the web server 116. Alternatively, the request may come from a web browser without running inside a native application (beyond the browser itself).

The components of the system 102 may collectively respond to a request for content from the client device 104. For example, web server 112 may communicate with file server 114 to publish or serve files stored on file server 114. Web server 112 may also communicate or interface with the application server 108 to enable web-based or hybrid applications and presentation of information. The application server 108 may consist of scripts, applications, or library files that provide primary or auxiliary functionality to the web server 112 (e.g., multimedia, file transfer, or dynamic interface functions). Applications may include code, which when executed by one or more processors, retrieves content based on device characteristics and present display of transmit) the content via one or more modules of an application The applications may also be business services of the content provider.

Figure 2:
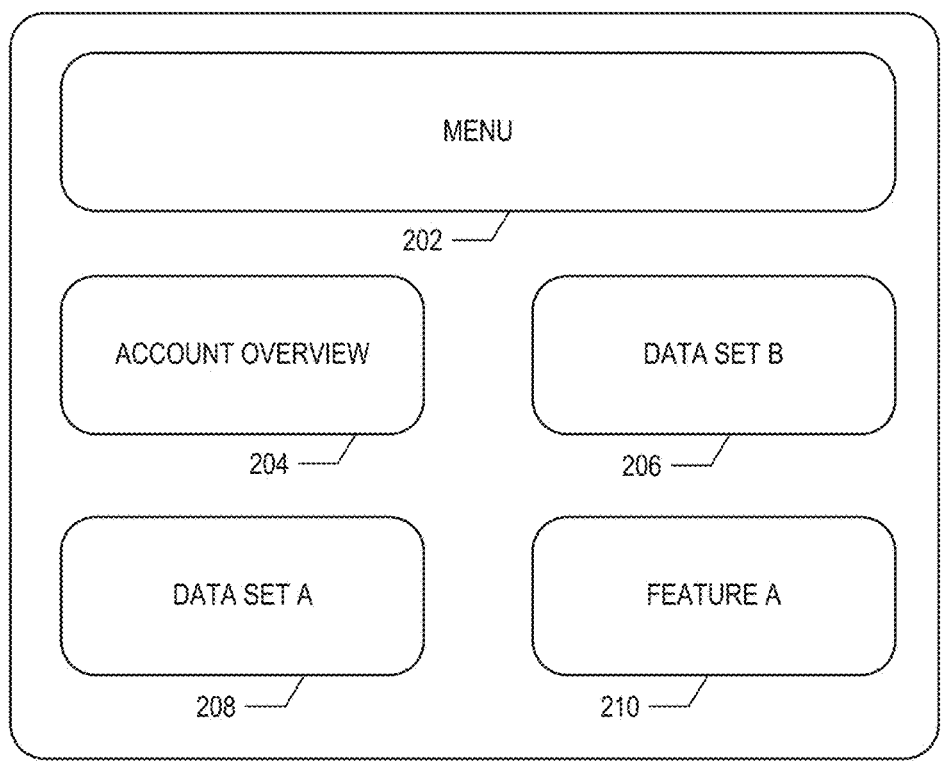
FIG. 2 illustrates a layout of an application, according to various examples.

FIG. 2 illustrates a layout of an application 200, The application 200 is divided into multiple modules that may be developed separately without regard to what device the application 200 is ultimately displayed on. Thus, a developer may quickly mix and match modules to create the overall look and feel of a single application for multiple devices. As illustrated in FIG. 2, the application 200 includes modules of a menu section 202, account overview section 204, data set B 206, data set A 208, and feature A 210. More or fewer modules may be used and the modules may be programmed in any suitable programming language without departing from the the scope of this disclosure.

Each module may be populated with content retrieved from system 102 or from a storage device of the client device 104. For example, each module may include one or more AJAX calls to the system 102. The content may include textual information, graphical information (e.g., video, pictures), audio, etc. As discussed in further detail below, the textual and graphical information transmitted to the client device 104 may be tailored to the capabilities of the client device 104. In some instances, despite the feature being part of the application 200, the client device 104 never sees an indication of the feature. This may be the case if feature A 210 requires a camera to be used. Thus, options for the feature A 210 may not be presented to a user.

Figure 3:
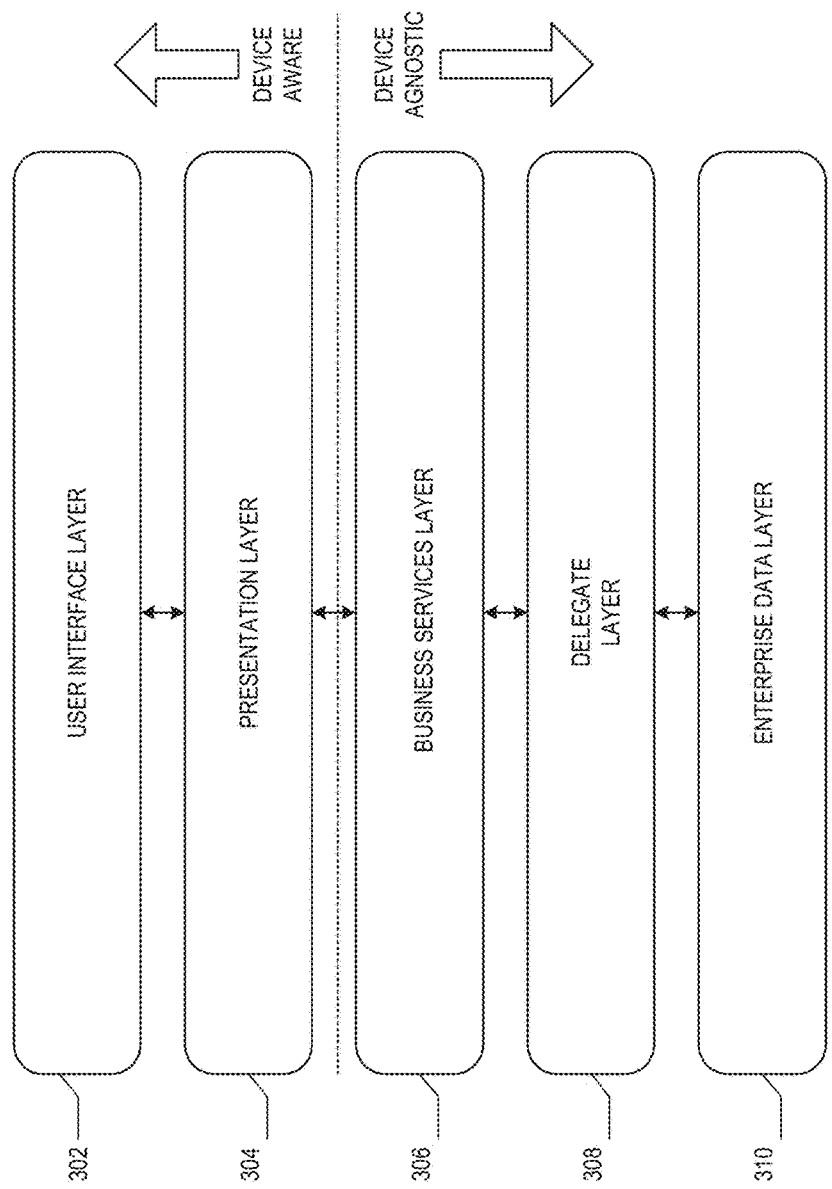
FIG. 3 illustrates a diagram depicting a series of layers to process a content request, according to various examples.

FIG. 3 illustrates a diagram 300 depicting a series of layers to process a content retrieval request. The diagram 300 includes five layers, the user interface layer 302, presentation layer 304, business services layer 306, delegate layer 308, and enterprise data layer 310. As illustrated, there is a conceptual dividing line between device aware layers and device agnostic layers. The user interface layer 302 and presentation layer 304 are included in the device aware layer whereas the business services layer 306, delegate layer 308, and enterprise data layer 310 are device agnostic. The separation described does not mean that there can be no business services above the line, but instead is meant as an illustration for content retrieval requests discussed in this disclosure.

The user interface layer 302 may coincide with the client device 104. User interface layer 302 may be the display of the client device 104 that ultimately shows data to a user. The user interface layer 302 may include the application running on the client device 104. The user interface layer 302 may communicate with the presentation layer 304 via the network 106 (e.g., to the web server 112).

The presentation layer 304 may include software executing on one or more of the components of the system 102. Accordingly, there may be software executing on at least one processor to process the content request from the user interface layer 302. The presentation layer 304 may also include device specific rules. The device specific rules may be stored in a data store such as the database 116. The rules may define how the content requests from different application modules are treated based on the capabilities of a device.

The device specific rules may include entries for many types of content or feature requests. An entry may include boundaries on how the data is retrieved based on the detected capabilities. The capabilities may include, but are not limited to, physical screen size, screen resolution, screen density, operating system, version of the operating system, type of device (e.g., personal desktop computer, wearable, etc.), number and types of sensors (e.g., accelerometers, gyroscopes), existence of a camera, type of camera, placement of camera (e.g., front or back), the existence of a fingerprint reader, processing capabilities for various media formats (e.g., mp4, H.264, etc.).

The presentation layer 304 may detect one or more of the device capabilities of the requesting device. The results of the capabilities may be matched to a rule stored in the device specific rules according to an identifier of the feature or request type. An identifier may include a type of data being requested (e.g., textual, graphical, output from a type of sensor, video, audio, etc.) or an alphanumerical descriptor (e.g., "feature A."). Thereafter, the content request may be denied, have boundaries or restrictions put on the request, or allowed with no restrictions (collectively. "rule boundaries").

A rule boundary may limit the numbering results when the content request is for a list of data (e.g., sports scores, social media posts, financial transactions etc.). Thus, only five results may be requested for a small-screened device whereas 25 results may be requested for a larger screen device. Other restrictions may be on the type or size of graphical data as certain devices may not be capable of displaying certain formats. Additionally, smaller versions of graphical data may be used for cellular devices to save bandwidth. Another restriction may be not allowing a feature if it requires a capability the device does not possess. For example, an application module may include a feature that requires a camera (e.g., posting a picture on a social media site, taking a picture of a check for a mobile device).

In another instance, some features may utilize touch-screen inputs. Thus, if the device does not include a touchscreen, the feature may not be presented (e.g., a touch button for taking a picture). Alternatively, a rule boundary may be established to request a version of the feature that does not use touch inputs. Yet another capability may be the presence of a fingerprint reader required for some features. The existence of the fingerprint reader may be used to set a rule boundary on retrieving a set of results. For example, the rule boundary may be to show 25 results if the device has a fingerprint reader, whereas the rule boundary may be to only show 1 if there is not a fingerprint reader. Many of the examples included herein use limiting the number of results as the rule boundary for discussion purposes, but at least the above described rule boundaries may also be used.

The presentation layer 304 may then forward the content request to the business services layer 306 with the set rule boundaries assuming that the content request was not denied immediately by the presentation layer 304. The business services layer 306 may receive the request with the rule boundary but have no knowledge of the device capabilities. Indeed, in some examples, the business services layer 306 may not be aware that a user has requested the data. As far as the business services layer 306 is concerned, the request may have come from another internal program.

The system 102 may have many services and application that are responsible for different tasks. In various examples, one service may respond to all requests for recent transaction information whereas another service may serve graphics for presenting on webpages. The business services layer 306 may determine where to route the request to retrieve the requested data. The request to the business services layer 306 may be in the form an API request. Thus, the request may include a function and name as well as one or more rule boundary parameters such as "Retrieve_recent_social_media_posts(number_of_posts)." The business services layer 306 may analyze the name or other identification of the request and match it with the correct service (e.g., by querying a database with the identification). The request may then be delegated down the identified service, The delegate layer 308 may retrieve the requested content information according to the rule boundary for the identified service. In some instances, the data is initially retrieved without regard to the rule boundary and the business services layer applies the boundary after retrieval. The data may be retrieved from one or more data sources in enterprise data layer 310. The data does not need to reside within the system 102 but may be stored on an external server.

Figure 4:
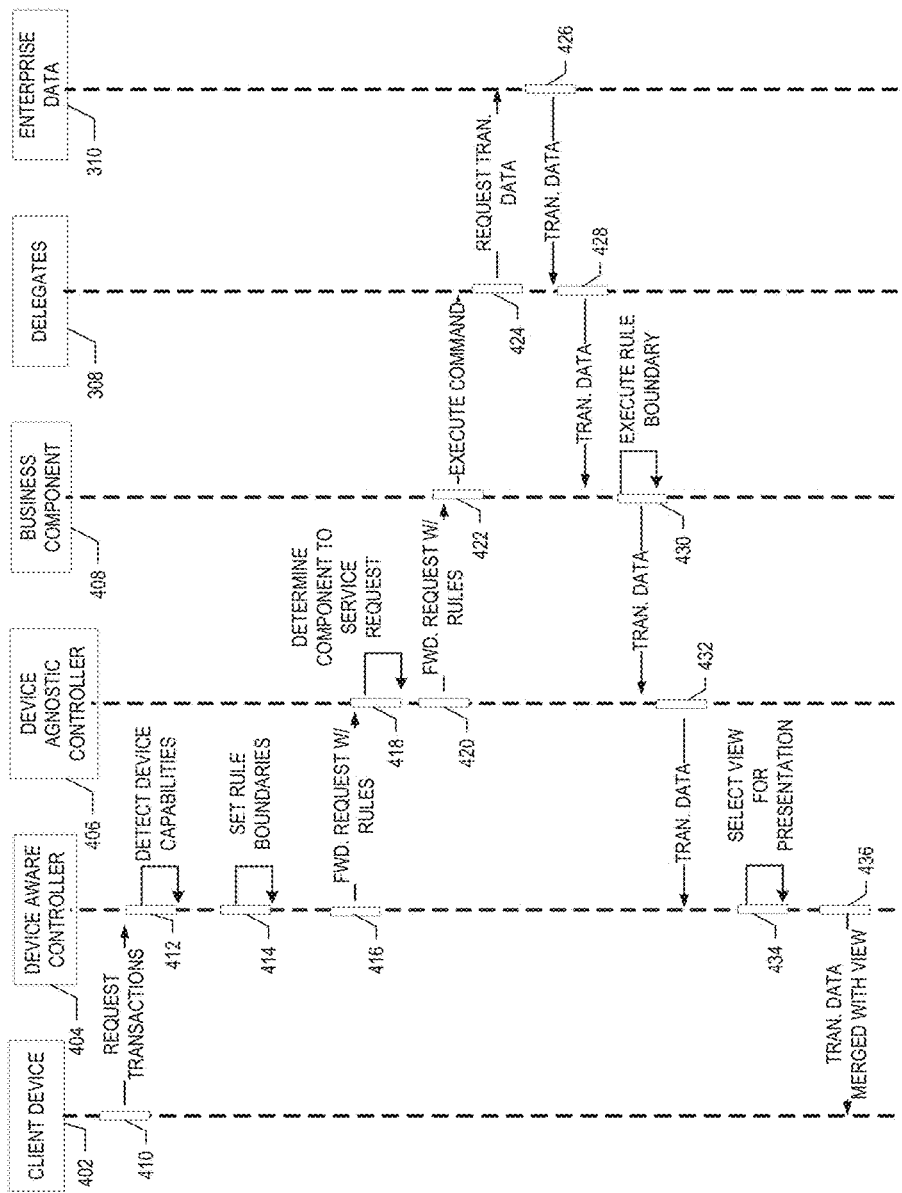
FIG. 4 illustrates a swim diagram of processing a content request, according to various examples.

FIG. 4 illustrates a swim lane diagram 400 of processing a content request. For discussion purposes a request for a set of transactions is discussed in the context of the components described herein. For example, the transactions may be a list of recent debits/credits of a savings account of a user. The swim diagram includes client device 402, device aware controller 404, device agnostic controller 406, business component 408, delegate layer 308, and enterprise data layer 310. With reference back to FIG. 3, the client device 402 may reside in the user interface layer 302, the device aware controller 404 in the presentation layer 304, and both the device agnostic controller 406 and business component 408 in the business services layer 306. A controller may be software executing on at least one processor that configure the at least one processor to perform the functions described herein.

At operation 410, client device 402 may transmit a request transactions message over a secure communication link to the device aware controller 404. The request may be secured over the Hypertext Transfer Protocol (HTFPS). At operation 412, the device aware controller 404 may detect the capabilities of the client device 402. In an example, a separate controller may first receive the request for transactions and detect the capabilities such as the model, maker, OS version, screen size, camera and other capabilities, etc. The capabilities may be detected by examining the user agent information included in the request. In some examples, the client device 402 transmits its capabilities with the request in a separate message.

At operation 414, the device aware controller 404 defines rule boundaries based on the capabilities. Continuing the example of a transaction request, the device aware controller 404 may set the number of transactions to 25. At operation 416 the request is forwarded to the device agnostic controller 406 for execution with the rule boundary. The forwarded request does not include an indication of what device requested the transaction information.

The device agnostic controller 406 may take over the request and find the right business component to execute the specific request at operation 418 and operation 420. So, for a transaction list (as may have been requested), it may call a Transaction Service, illustrated as business component 408. As with device agnostic controller 406, the business component 408 has no knowledge of the device. The business component 408 may represent a stateless component that has no knowledge of why it was called or what called it. Instead, it executed the request to retrieve transaction information.

Thus, the business component 408 may utilize the delegate layer 308 at operation 422 to retrieve the transaction data from somewhere in the enterprise data layer 310 at operation 424. For example, the delegate layer 308 may have one or more interfaces to different data stores in the enterprise data layer 310 such as HTTP, Simple Object Access Protocol (SOAP), Java Database Connectivity (JDBC), IBM MQ, external data sources, etc. At operation 426 the received transactions are transmitted back to the delegate layer 308 which in turn, at operation 428 forwards the transactions to business component 408.

The business component 408 may take the transactions received from delegate layer 308 and, at operation 430, apply the rule boundary received from device agnostic controller 406. Thus, in the example above, if more than 25 transactions were received, the set of transactions may be truncated to 25. Alternatively, the rule boundary may be applied as a parameter before transmitting to the delegate layer 308 (e.g., only request a maximum of 25 transactions). Accordingly, after the rule boundary is applied, the remaining transactions are forwarded back to the device agnostic controller 406 at operation 432 that, in turn, transmits the transactions back to the device aware controller 404 (operation 434).

The device aware controller 404 may, at operation 436, determine the right physical format to transmit the resulting transactions to the client device 402. The determination may be made by using the previously determined capabilities of the device. Thus, one device may have requested a JSON object be returned whereas another device may utilize a HTML or JSP response. The data may be merged into the correct format and transmitted back to the client device 402. The client device 402 may then display, on a display device, the transactions within a module of an application.

In general the timing of operations is described from top to bottom (e.g., operation 410 occurs before 412); however, in some examples the operations may be performed in a modified order. For example, the rule boundary operation 430 may be applied before the business component 408 executes the command (422). Thus, the business rule may have the rule context before it is executed.

Figure 5:
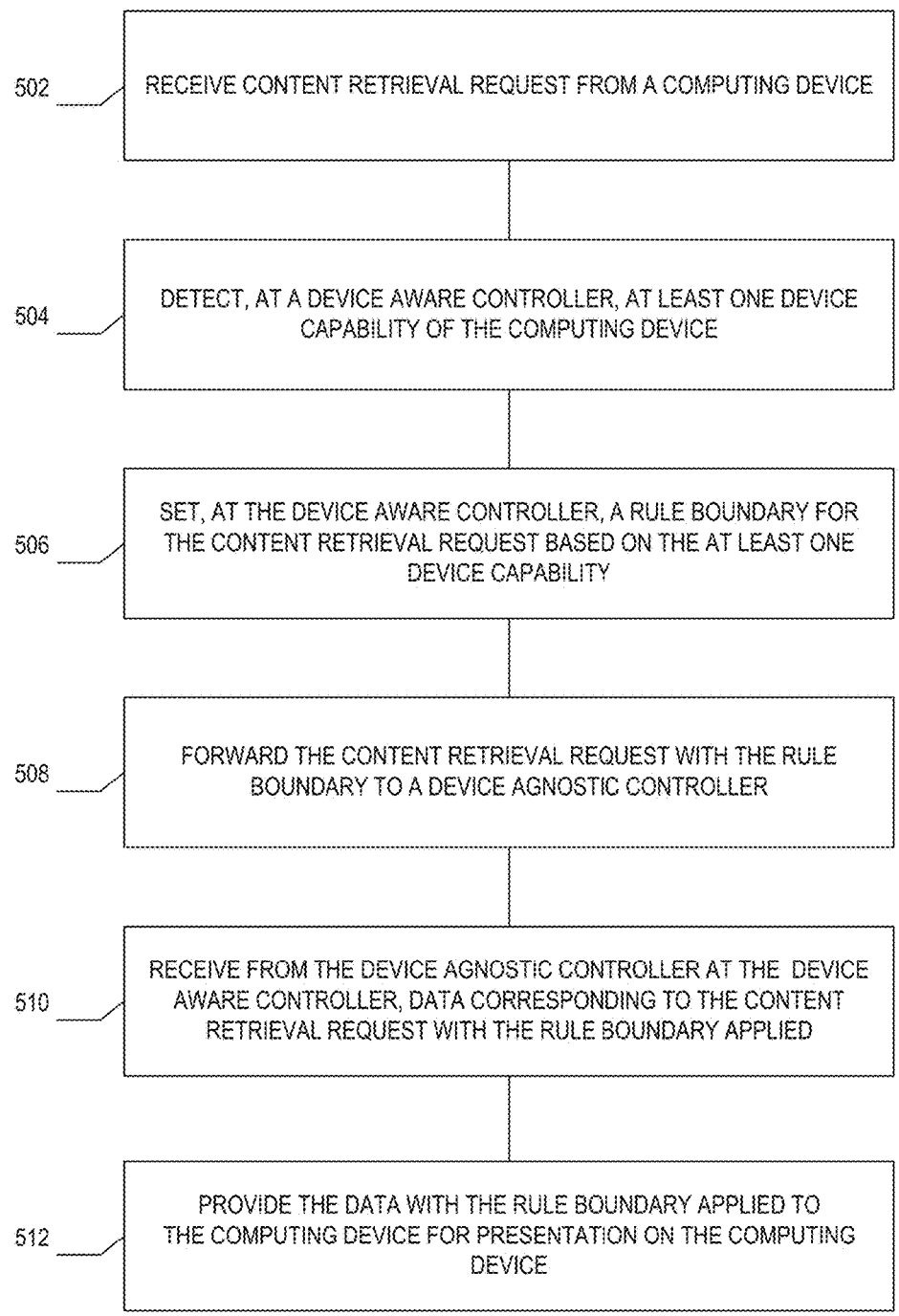
FIG. 5 illustrates a method to process a content request, according to various examples.

FIG. 5 illustrates a method 500 to process a content retrieval request, according to various examples. The method 500 may be performed by any of the modules, layers, logic, or components described herein. In block 502, the method may be begin by receiving the content retrieval request from a computing device. The request may be in the form of an AJAX request, API, or other electronic protocol. The content request may part of a series of requests common to an application executing on the computing device. The content retrieval request from the computing device may include receiving a request for a set of data items.

In block 504, a device aware controller may detect at least one device capability of the computing device. The capability may include the presence of one or sensors, the operating system, the type of device, and the type of display of the computing device.

In block 506, the device aware controller may set a rule boundary for the content retrieval request based on the at least one device capability. The rule boundary may be determined by querying a database table with the type of content request and the at least one device capability. For example, if the type of request is a list of data, there be a limit on the number of data items retrieved. The rule boundary may also be a format of graphical information retrieved (e.g., PNG, GIF, video type, or size of the graphic) when the content request is for a graphic.

In block 508, the content retrieval request may be forwarded with the rule boundary to a device agnostic controller. In some embodiments, the content retrieval request does not may include capability information associated with the computing device such as the information detected in block 504.

In block 510, data corresponding to the content retrieval request is received from the device agnostic controller at the device aware controller. The method 500 may further include determining, at the device agnostic controller, a component to execute the content retrieval request and transmit the content retrieval request from the device agnostic controller to the component. The data corresponding to the content retrieval request may be fetched by the component (e.g., accessing a database, sending a query to an external service, etc.). The device agnostic controller may apply the rule boundary to the fetched data. before transmitting to the device aware controller.

In block 512, the data with the rule boundary applied is transmitted to the computing device for presentation on the computing device. The device aware controller may also select a format for the data based on the type of the computing device and format the data according to the selected format before transmission.

Figure 6:
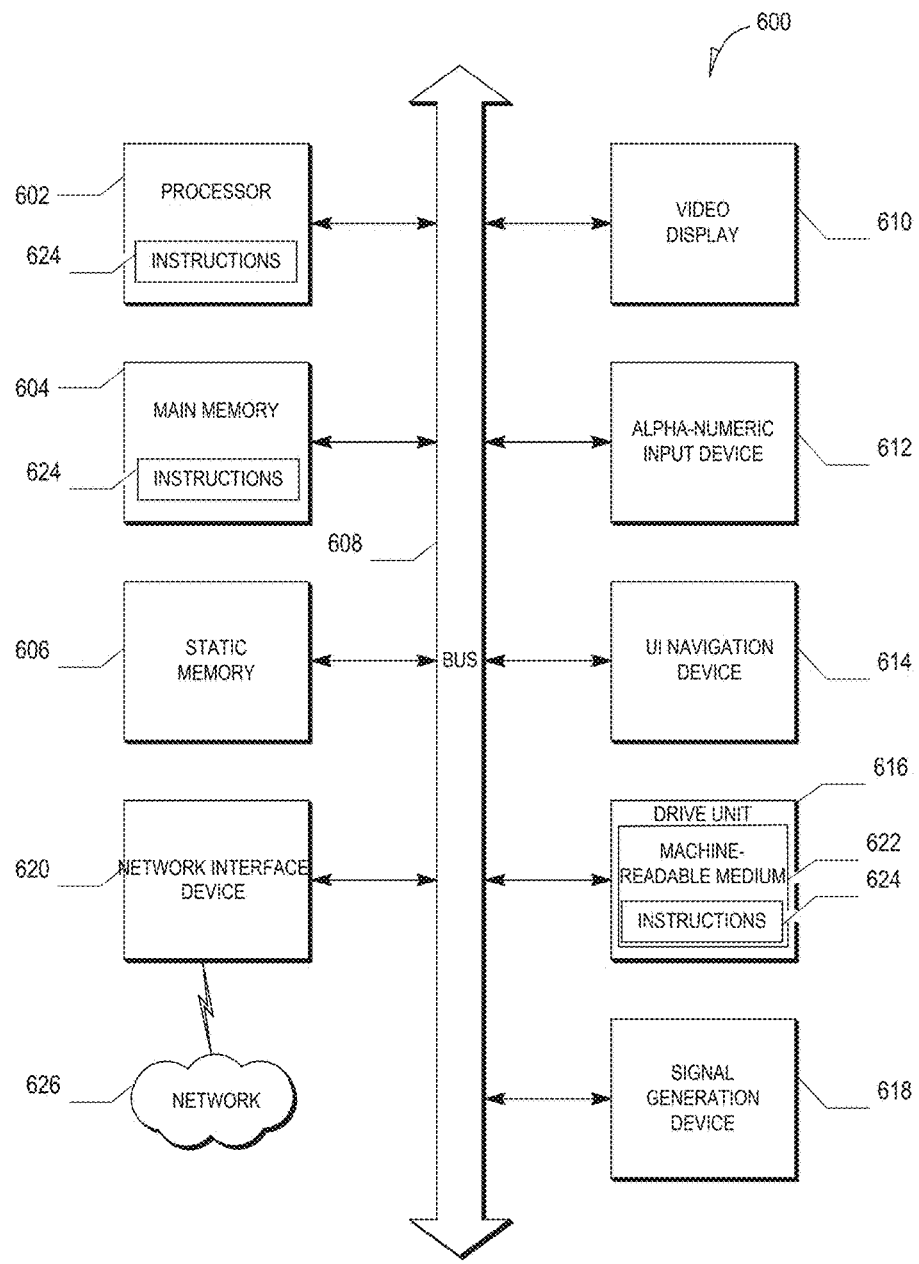
FIG. 6 is a block diagram of a machine in the example form of a computer system within which a set of instructions, for causing the machine to perform any one or more of the methodologies discussed herein, may be executed.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and. UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and. DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for responding to a content retrieval request at a server, the method comprising:
   receiving the content retrieval request from a computing device;
   detecting, at a device aware controller, at least one device capability of the computing device;
   setting, at the device aware controller, a rule boundary for the content retrieval request based on the at least one device capability;
   forwarding the content retrieval request with the rule boundary to a device agnostic controller, wherein the content retrieval request does not include capability information associated with the computing device;
   receiving from the device agnostic controller at the device aware controller, data corresponding to the content retrieval request with the rule boundary applied; and
   providing the data with the rule boundary applied to the computing device for presentation on the computing device.

2. The method of claim 1, further comprising:
   determining, at the device agnostic controller, a component to execute the content retrieval request; and
   transmitting the content retrieval request from the device agnostic controller to the component.

3. The method of claim 2, further comprising:
   receiving at the device agnostic controller from the component, the data corresponding to the content retrieval request;
   applying the rule boundary to the data corresponding to the content retrieval request; and
   forwarding the data from the device agnostic controller to the device aware controller.

4. The method of claim 1, further comprising:
   selecting a format for the data, at the device aware controller, based on the type of the computing device.

5. The method of claim 4, wherein providing the data to the computing device for presentation on the computing device comprising providing the data in the selected format.

6. The method of claim 1, wherein receiving the content retrieval request from the computing device includes receiving a request for a set of data items.

7. The method of claim 6, wherein setting the rule boundary for the content retrieval request based on the at least one device capability includes setting a limit on the number of data items.

8. The method of claim 1, wherein setting the rule boundary for the content retrieval request based on the at least one device capability includes selecting a graphical format.

9. A computing apparatus for responding to a content retrieval request at a server, the computing apparatus comprising:
   a processor; and
   a memory storing instructions that, when executed by the processor, configure the processor to:
      receive the content retrieval request from a computing device;
      detect, at a device aware controller, at least one device capability of the computing device;
      set, at the device aware controller, a rule boundary for the content retrieval request based on the at least one device capability;
      forward the content retrieval request with the rule boundary to a device agnostic controller, wherein the content retrieval request does not include capability information associated with the computing device;
      receive from the device agnostic controller at the device aware controller, data corresponding to the content retrieval request with the rule boundary applied; and
      provide the data with the rule boundary applied to the computing device for presentation on the computing device.

10. The computing apparatus of claim 9, wherein the instructions further configure the processor to:
    determine, at the device agnostic controller, a component to execute the content retrieval request; and
    transmit the content retrieval request from the device agnostic controller to the component.

11. The computing apparatus of claim 10, wherein the instructions further configure the processor to:
    receive at the device agnostic controller from the component, the data corresponding to the content retrieval request;
    apply the rule boundary to the data corresponding to the content retrieval request; and
    forward the data from the device agnostic controller to the device aware controller.

12. The computing apparatus of claim 9, wherein the instructions further configure the processor to:

select a format for the data, at the device aware controller, based on the type of the computing device.

13. The computing apparatus of claim 12, wherein the instructions to provide the data to the computing device for presentation on the computing device include instructions to provide the data in the selected format.

14. The computing apparatus of claim 9, wherein the instructions to receive the content retrieval request from the computing device include instructions to receive a request for a set of data items.

15. The computing apparatus of claim 14, wherein the instructions to set the rule boundary for the content retrieval request based on the at least one device capability include instructions to set a limit on the number of data items.

16. The computing apparatus of claim 9, wherein the instructions to set the rule boundary for the content retrieval request based on the at least one device capability includes instructions to select a graphical format.

17. A non-transitory computer-readable storage medium for responding to a content retrieval request at a server, the computer-readable storage medium including instructions that when executed by a computer, cause the computer to perform operations of:
   receiving the content retrieval request from a computing device;
   detecting, at a device aware controller, at least one device capability of the computing device;
   setting, at the device aware controller, a rule boundary for the content retrieval request based on the at least one device capability;
   forwarding the content retrieval request with the rule boundary to a device agnostic controller, wherein the content retrieval request does not include capability information associated with the computing device;
   receiving from the device agnostic controller at the device aware controller, data corresponding to the content retrieval request with the rule boundary applied; and
   providing the data with the rule boundary applied to the computing device for presentation on the computing device.

18. The computer-readable storage medium of claim 17, wherein the operations further include:
   determining, at the device agnostic controller, a component to execute the content retrieval request; and
   transmitting the content retrieval request from the device agnostic controller to the component.

19. The computer-readable storage medium of claim 18, wherein the operations further include:
   receiving at the device agnostic controller from the component, the data corresponding to the content retrieval request;
   applying the rule boundary to the data corresponding to the content retrieval request; and
   forwarding the data from the device agnostic controller to the device aware controller.

20. The computer-readable storage medium of claim 17, wherein the operations further include:
   selecting a format for the data, at the device aware controller, based on the type of the computing device.

* * * * *